United States Patent [19]
Bradshaw et al.

[11] Patent Number: 5,179,213
[45] Date of Patent: Jan. 12, 1993

[54] MACROCYCLIC LIGANDS BONDED TO AN INORGANIC SUPPORT MATRIX AND A PROCESS FOR SELECTIVELY AND QUANTITATIVELY REMOVING AND CONCENTRATING IONS PRESENT AT LOW CONCENTRATIONS FROM MIXTURES THEREOF WITH OTHER IONS

[75] Inventors: Jerald S. Bradshaw; Reed M. Izatt; Virginia B. Christensen; Ronald L. Bruening, all of Provo, Utah

[73] Assignee: Brigham Young University, Provo, Utah

[21] Appl. No.: 517,127

[22] Filed: May 1, 1990

Related U.S. Application Data

[63] Continuation-in-part of Ser. No. 240,689, Sep. 6, 1988, Pat. No. 4,943,375.

[51] Int. Cl.$^5$ ............... C07D 327/00; C07D 325/00
[52] U.S. Cl. ........................... 549/3; 549/4; 549/10; 549/11; 549/214; 549/210; 549/342
[58] Field of Search ............ 549/3, 4, 10, 11, 210, 549/214, 342

[56] References Cited
PUBLICATIONS

N. Nakajima et al., *Journal of Liquid Chromatography*, 7 (11), pp. 2115–2125 (1984).
M. Lauth et al.. *Journal of Liquid Chromatography*, 8 (13), pp. 2403–2415 (1985).
R. M. Izatt et al., *Chem. Rev.*, "Thermodynamic and Kinetic Data for Cation–Macrocycle Interaction", 85, 271–339 (1985).
L. F. Lindoy, "Progress in Macrocycle Chemistry", ed R. M. Izatt et al., pp. 53–92, John Wiley & Sons, New York (1987).
V. Dudler, et al., *Aust. J. Chem.*, "An Oxygen-Nitrogen Donor Macrocycle Immobolized on Silica Gel", 40, pp. 1557–1563 (1987).
S. L. Regen, *Angew. Chem. Int. Ed. Eng.*, "Triphase Catalysts", 18, (6), pp. 421–492 (1979).

*Primary Examiner*—Richard L. Raymond
*Assistant Examiner*—M. W. Russell
*Attorney, Agent, or Firm*—Thorpe, North & Western

[57] ABSTRACT

A process of separating one or more seleced species of ions from a solution containing the ions comprises contacting the solution with a novel composition of matter comprising a hydrocarbon chain covalently bonded to a macrocyclic compound, wherein the macrocyclic compound has at least four —A—C—C— linkages in which A for each such linkage, is independently selected from the group consisting of O, O—CH$_2$, S, SH$_2$, NR, and NRCH$_2$, with R being independently selected from the group consisting of hydrogen, alkyl and benzyl, and wherein the hydrocarbon chain has an end group

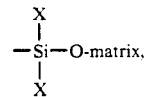

with X being independently selected from the group consisting of lower alkyl, benzyl, phenyl, halogen, O—CH$_3$, O—C$_2$H$_5$ and O-matrix, and with matrix being independently selected from the group consisting of silica, silica gel, glass, glass fibers, titania, zirconia, alumina and nickle oxide. A complex is formed between the selected ions and the composition of matter to remove the selected species of ions from the solution. The solution is separated from the complex, and the complex is thereafter contacted with an eluant which frees the selected ions from the complex into solution in the eluant.

7 Claims, 2 Drawing Sheets

MACROCYCLIC LIGANDS BONDED TO AN INORGANIC SUPPORT MATRIX AND A PROCESS FOR SELECTIVELY AND QUANTITATIVELY REMOVING AND CONCENTRATING IONS PRESENT AT LOW CONCENTRATIONS FROM MIXTURES THEREOF WITH OTHER IONS

INTRODUCTION

This application is a continuation-in-part of our co-pending application Ser. No. 07/240,689 filed Sep. 06, 1988 now U.S. Pat. No. 4,943,375.

The present invention comprises novel compositions of matter and processes of using them. The compositions of matter comprise an inorganic solid support matrix, e.g., silica, silica gel, glass, glass fibers, titania, zirconia, alumina and nickel oxide, which is covalently bonded to a hydrocarbon chain which in turn is bonded to a macrocyclic ligand either directly or through an ether oxygen linkage. The macrocyclic ligand is selected from compounds which have at least four —A—CH$_2$—CH$_2$— groups in which A is independently selected from O, O—CH$_2$, S, S—CH$_2$, NR, and NRCH$_2$, with R being independently selected from H, lower alkyl and benzyl. The hydrocarbon chain has an end group consisting of

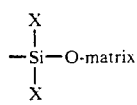

covalently bonded thereto, wherein X is selected from lower alkyl, phenyl, benzyl, halogen, O—CH$_3$, OC$_2$H$_5$, and O-matrix.

Representative families of compounds, i.e., complexing agents, contemplated by the present invention are illustrated by the following structural formulae I to V.

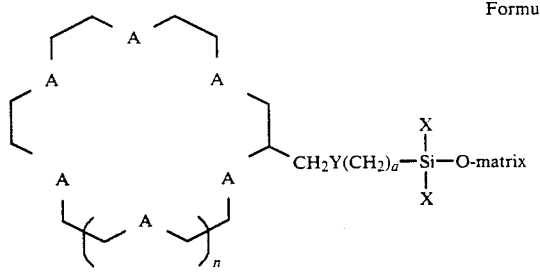

Formula I

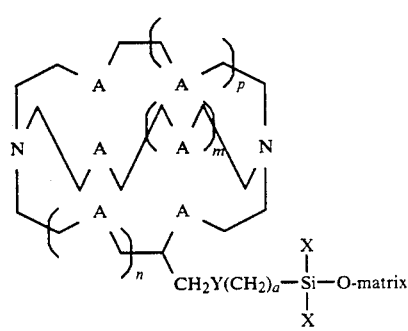

Formula II

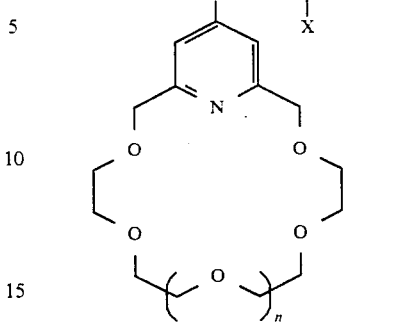

Formula III

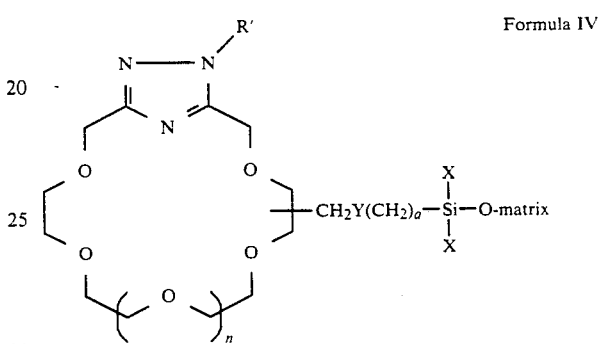

Formula IV

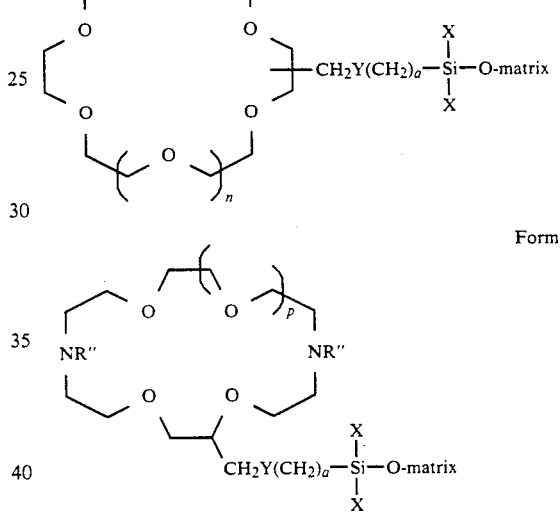

Formula V wherein A is defined as above X is selected from the group consisting of alkyl, alkoxy, chlorine and O-matrix; Y is selected from the group consisting of O and CH$_2$; R' is selected from the group consisting of hydrogen and alkyl; R" is selected from the group consisting of hydrogen, lower alkyl and aryl; a is an integer from 2 to 16; m, n and p are integers from 0 to 2.

The process comprises selectively and quantitatively removing and concentrating one or more selected species of ions present at low concentrations from a plurality of other ions in a multiple ion solution in which the other ions may be present at much higher concentrations. The multiple ion solution is brought into contact with a composition of matter of the invention. The preferred embodiment disclosed herein involves carrying out the process by bringing a large volume of the multiple ion solution into contact with a complexing agent consisting of a macrocyclic ligand covalently bonded through a hydrocarbon side chain to a solid inorganic support matrix. Contact is preferably made in a separation column containing the complexing agent. The multiple ion solution passes through the column to complex the desired ion or ions with the complexing agent. Following the complexing step, a small volume of a receiving liquid or eluant is brought into contact with the loaded complexing agent to break the complex by chemical or thermal means and to dissolve the desired ions and carry them away from the complexing agent. Various contact apparatus may be used instead of a column. The multiple ion solution can be slurried or mixed with the complexing agent in a stirred vessel vessel, for example. The loaded complexing agent is then separated from the solution and washed with a receiving liquid or eluant to break the complex and recover the desired ion or ions from the complexing agent. The desired ions can then be recovered from the receiving phase by well known procedures.

More particularly, the process comprises forming a chemical covalent bond between an inorganic solid support member, such as those mentioned previously including silica and silica gel, and at least one of the macrocyclic ligands to from the complexing agent. The complexing agent is then introduced into a contacting device such as a tall column. The solution containing the multiple species of ions flows through the column in contact with the complexing agent, whereby the desired ions complex with the complexing agent. The desired ions are thus separated from the rest of the mixture which flows out of the column. A small volume of the receiving liquid or eluant is then passed through the column to break the complex and dissolve and carry out of the column the device ion(s). The desired ions are then recovered from the receiving phase by well known procedures.

BACKGROUND OF THE INVENTION

The fact is known that macrocyclic polyethers and other macrocyclic ligands present as solutes in a solvent such as water are characterized by their ability to selectively form strong bonds with particular ions or groups or ions present as solutes in the same solvent according to size, donor atom-related and other well known selectivity rules as noted in articles by R. M. Izatt, J. S. Bradshaw, S. A. Nielsen, J. D. Lamb, J. J. Christensen, and D. Sen, *THERMODYNAMIC AND KINETIC DATA FOR CATION-MACROCYCLE INTERNATIONAL*, Chem. Rev., 1985, Vol. 85, 271-339 and by L. F. Lindoy, in *PROGRESS IN MACROCYCLIC CHEMISTRY*, edited by R. M. Izatt and J. J. Christensen, JOHN WILEY & SONS, pages 53-92 (1987). However, researchers have not previously been able to incorporate macrocycles into separation systems where the behavior of the macrocycle in the separation system in comparison to that of the macrocycle as a solute is unchanged and/or the macrocycle will remain in the separation system. Articles such as those entitled *ION-CHROMATOGRAPHIC SEPARATION OF SILICA GRAFTED WITH BENZO-18-CROWN-6-ETHER* by M. Lauthard and Ph. Germain, J. Liquid Chromatogr., 1985, Vol. 8, 2403-2415, and *ION-CHROMATOGRAPHY ON POLY (CROWN ETHER-MODIFIED) SILICA POSSESSING HIGH AFFINITY FOR SODIUM* by M. Nakajima, K. Kumura, E. Hayata and T. Shono, J. Liquid Chromatogr., 1984, Vol. 7, 2115-2125, have disclosed the bonding of crown ethers to silica gels but they and most other reported macrocycle bonded silicas contain a benzene group or other electron withdrawing groups as part of a macrocycle side chain which reduces the ability of the macrocycle to bond with ions in comparison to the situation where the macrocycle and ions are present as solutes in solution. The only other reported examples of bonding of macrocycles to sand or silica gel have involved bonding via a side chain connected to one of the electron rich macrocycle donor atoms, i.e., nitrogen. One such reference is entitled *AN OXYGEN-NITROGEN DONOR MACROCYCLE IMMOBILIZED ON SILICA GEL. A REAGENT SHOWING HIGH SELECTIVELY FOR Cu (II) IN THE PRESENCE OF Co(II), Ni(II) OR Zn(II)*, by V. Dudler, L. F. Lindoy, D. Sallin, C. W. Schlaepfer, Aust. J. Chem., 1987, Vol. 40, p. 1557. However, such bonding changes the geometry of the compound and greatly reduces the ability of the macrocycle to interact with ions. Prior researchers in this field confined their research to analytical chromatographic applications and disclosed no concept of industrial separation applications where strong macrocycle-ion bonding is required to quantitatively recover the desired ion(s) from solution and high selectivity is required to obtain a product free from contaminants. The strength of macrocycle-ion bonding is particularly important when ions present in solution at low concentrations need to be recovered. The greater the value of the equilibrium constant for ion-macrocycle interaction, the lower the initial concentration of the ion in solution can be and still be efficiently and quantitatively complexed. Hence, the ability to attach these macrocycles to an inorganic, solid support, such as sand or silica gel, without reducing the ability of the macrocycle to complex ions is of the utmost importance in the industrial use of macrocycles. The process of the present invention successfully accomplished this feat.

SUMMARY OF THE INVENTION

The compounds of the present invention comprise certain macrocyclic ligands covalently bonded to a solid inorganic support matrix, such as those mentioned previously including silica and silica gel. The compounds so produced are identified above. The process of the present invention uses the novel compounds to selectively separate and recover desired species of ions from solutions containing multiple species of ions. The complexing agents of the present invention are characterized by high selectivity for and removal of desired metal ions or groups of metal ions from a solution containing multiple species of ions, even when species of undesired ions are present in much higher concentrations than the desired species of ions. The process of selectively removing and concentrating the desired ion(s) is characterized by the ability to quantitatively complex from a large volume of solution the desired ion(s) when they are present even at very low concentrations. The desired ions are recovered from the separation column by flowing a small volume of a receiving phase or eluant through the column. The eluant contains a solubilized reagent which need not be selective, but which will strip the ions from the macrocyclic ligand quantitatively. The recovery of the desired metal ions from the receiving phase or eluant is easily accomplished by well known procedures.

BRIEF DESCRIPTION OF THE DRAWINGS

The invention will be described and illustrated by reference to the drawings in which.

DESCRIPTION OF THE PREFERRED EMBODIMENT OF THE INVENTION

PREPARATION OF MATERIALS

Figure 1:
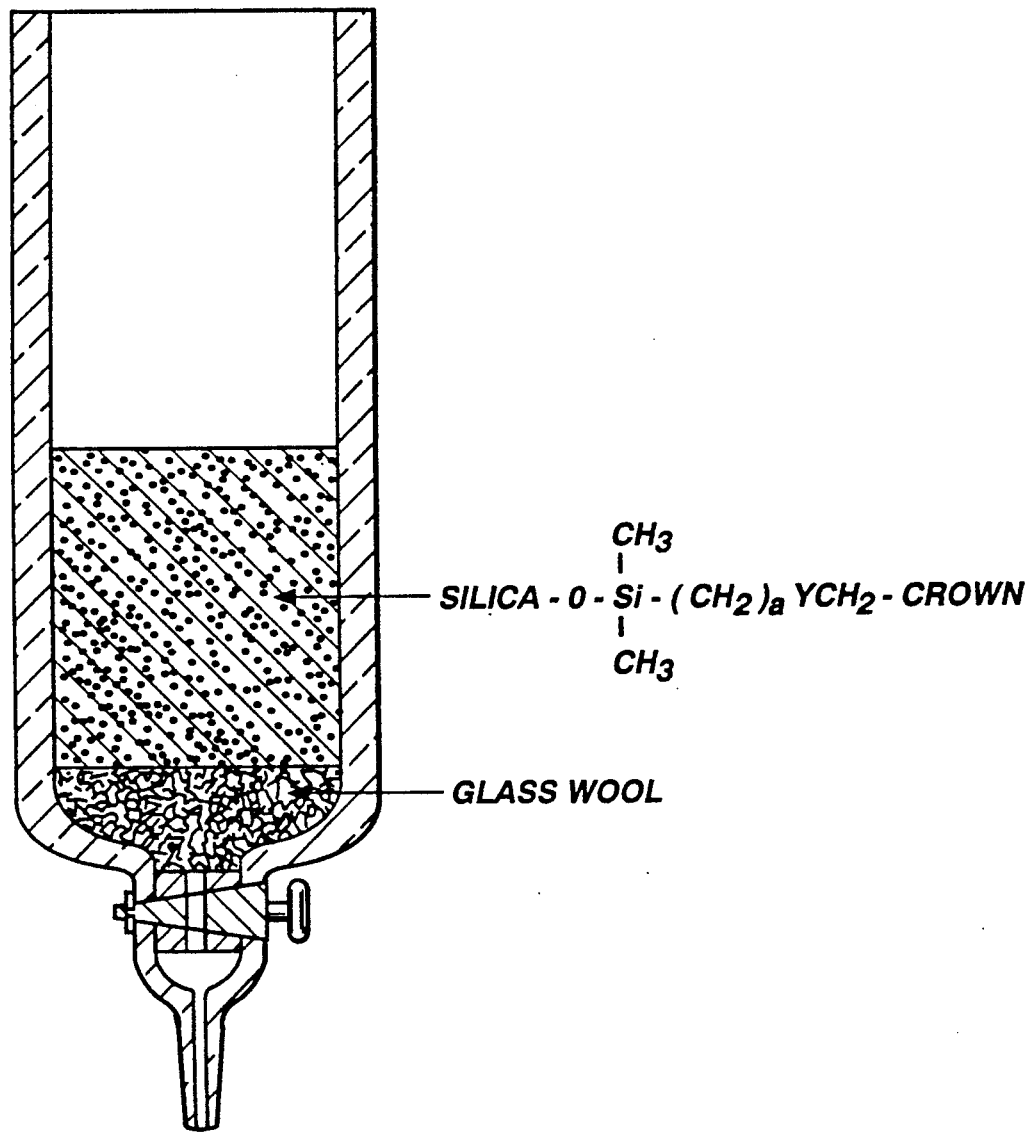
FIG. 1 represents schematically a suitable column which contains the novel macrocyclic ligand materials of the present invention and through which a solution of desired ions can flow in contact with the ligand materials to selectively form a complex between the desired ion or group of ions in accordance with the invention.

Macrocycles which do not contain electron withdrawing groups and which are capable of being bonded to the solid inorganic matrix, such as silica, silica gel, glass, glass fibers, titania, zirconia, alumina and nickel oxide, are synthesized. Then the macrocycle is covalently bonded to the inorganic support matrix. One method of preparing the compounds of Formula I, for example, is to react the allyloxy forms of the crowns with triethoxysilane (or trichlorosilane or dichloromethylsilane or chlorodimethylsilane) followed by heating the resulting silane with silica as follows:

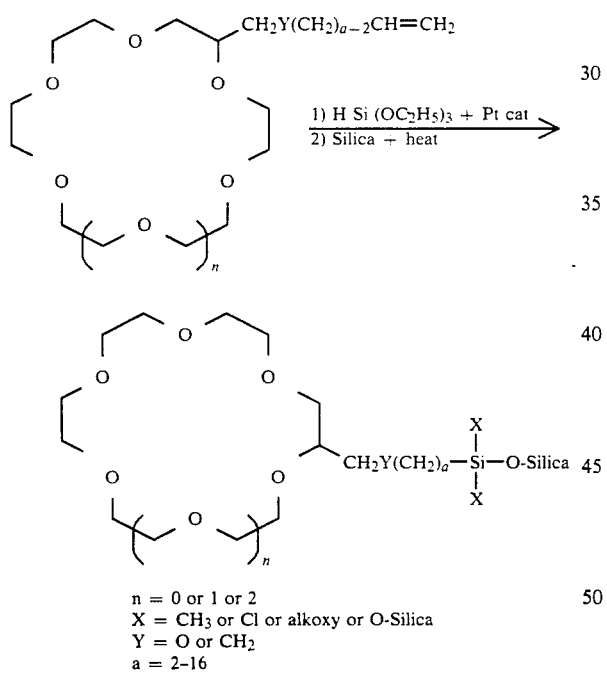

n = 0 or 1 or 2
X = $CH_3$ or Cl or alkoxy or O-Silica
Y = O or $CH_2$
a = 2–16

The synthesis of the allyloxy forms of the crowns, which is not part of the present invention, is described in an article entitled *FACILE SYNTHESIS OF HYDROXYMETHYLCROWN ETHERS* by I. Ikeda, H. E. Mura and M. Okahara, Synthesis pages 73 and 74 (1984), which is incorporated herein by reference.

A method for preparing the macrocyclic compounds of Formula II is to react the cryptand compound having a —$CH_2$—O—$CH_2CH=CH_2$ side chain with triethoxysilane (or trichlorosilane or dichloromethylsilane or chlorodimethylsilane) in the presence of a platinum catalyst to convert the side chain to —$CH_2$—O—($CH_2$)$_3$—Si($CH_3$)ClX (where X=(Cl or $CH_3$) and heating this compound with silica as follows:

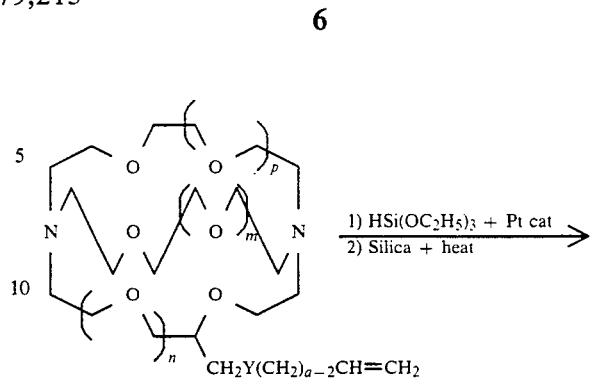

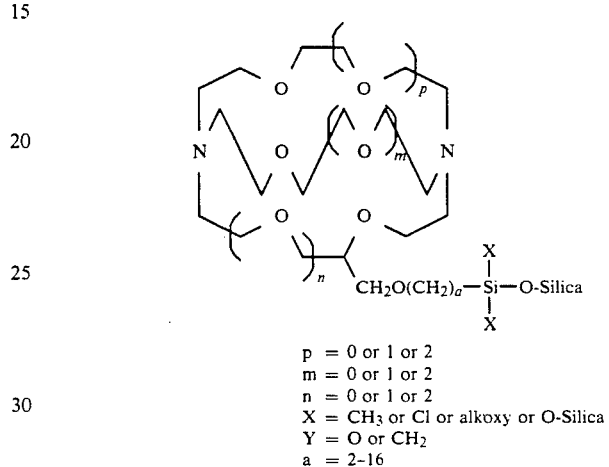

p = 0 or 1 or 2
m = 0 or 1 or 2
n = 0 or 1 or 2
X = $CH_3$ or Cl or alkoxy or O-Silica
Y = O or $CH_2$
a = 2–16

The synthesis of the —$CH_2$—O—$CH_2CH=CH_2$ substituted 2.2.2 cyrptand (p=n=m=1) which is not part of the present invention, is described in an article entitled *SYNTHESIS OF HYDROXYMETHYL-FUNCTIONALIZED DIAZACROWNS AND CRYUPTANDS* by David A. Babb, Bronislaw P. Czech and Richard A. Bartsch, J. Heterocyclic Chem., Vol. 23, pages 609, 613 (1986), which is incorporated herein by reference.

A method of preparing the macrocyclic compounds of Formula III, for example, is to react 4-allyloxypyridino-18-crown-6 with triethoxysilane (or trichlorosilane or dichloromethylsilane or chlorodimethylsilane) and heating the resulting chlorosilane and silica as follows:

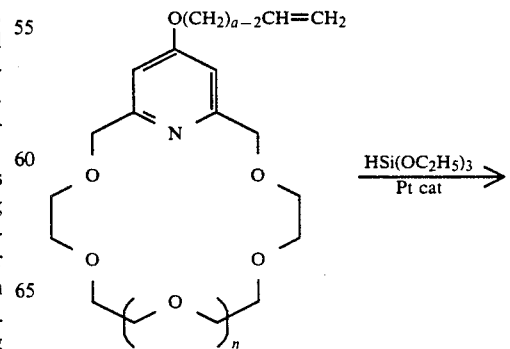

-continued

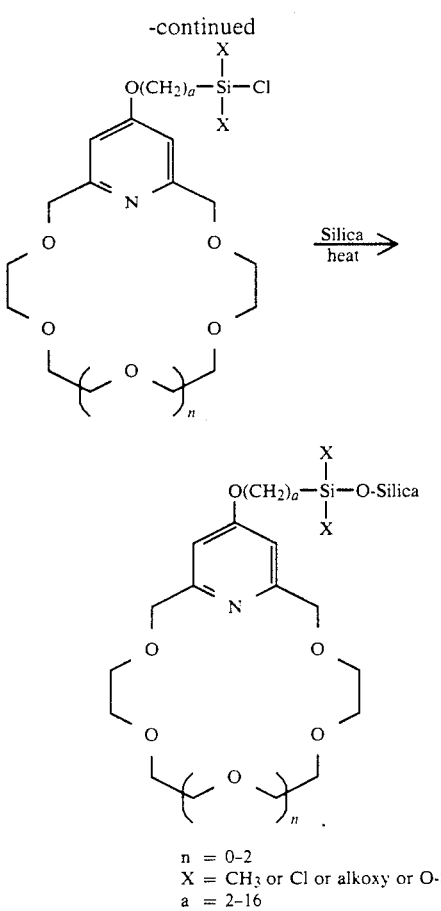

n = 0-2
X = CH₃ or Cl or alkoxy or O-Silica
a = 2-16

The synthesis of 4-allyloxypyridino-18-crown-6 (where n =1), which is not part of the present invention, is described in an article entitled PROTON-IONIZABLE CROWN ETHERS. 3. SYNTHESIS AND STRUCTURAL STUDIES OF MACROCYCLIC POLYETHER LIGANDS CONTAINING A 4-PYRIDONE SUBCYCLIC UNIT, by Jerald S. Bradshaw, Yohji Nakatsuji, Peter Huszthy, Bruce E. Wilson, N. Kent Dalley and Reed M. Izatt, J. Heterocyclic Chem. Vol. 23, pages 353-360 (1986), which is incorporated herein by reference.

It should be emphasized that any macrocycle which can by synthesized with a —$CH_2$—O—$CH_2$CH=$CH_2$ side chain or the like attached to one of the regular carbon atoms of the macrocycle could then be covalently bonded to the solid support matrix, such as silica or silica gel. The interaction properties of this bonded macrocycle will not differ from those of the unsubstituted macrocycle present as a solute in solution when such a macrocycle does not contain electron withdrawing substituent groups and the bonding to sand or silica gel does not occur via one of the macrocycle donor atoms. This will now be described in more detail in the following description of the metal ion recovery and concentration process.

METAL ION RECOVERY AND CONCENTRATION

The metal ion recovery and concentration process of the invention relates to the selective recovery of desired metal ions from mixtures thereof with other metal ions using the compounds of the invention as defined above. Effective methods of recovery and/or separation of metal ions, particularly silver, lead, cadmium, and other heavy metals, from one another in culinary water supplies, waste solutions, deposits and industrial solutions and silver recovery from waste solutions, e.g., from emulsions on photographic and Xray film, represent a real need in modern technology. These ions are typically present at low concentrations in solutions containing other ions at much greater concentrations. Hence, there is a real need for a process to selectively recover and concentrate these hazardous and/or desirable ions. The present invention accomplishes this separation effectively and efficiently by the use of the macrocyclic ligands bonded to the solid support matrix in accordance with the present invention.

The process will be described with respect to macrocyclic ligands bonded to silica, such as the compounds shown in Formulas I through V. A macrocycle-bonded silica compound is chosen that will selectively complex the ion(s) of interest. There is a large data base for measurements of macrocycle-ion interactions where the macrocycle is unsubstituted and present as a solute in a solvent. Much of this data base is presented in an article by R. M. Izatt, J. S. Bradshaw, S. A. Nielsen, J. D. Lamb, J. J. Christensen, and D. Sen, THERMODYNAMIC AND KINETIC DATA FOR CATION-MACROCYCLE INTERACTION, Chem. Rev. Vol. 23, 271-339 (1985). Previously, this data base has only provided general qualitative predictions about the behavior of macrocycles incorporated into separation processes. However, in the process of the invention the equilibrium constants for ion-macrocycle interaction for macrocycles present as solutes in solution vs. that for macrocycles bonded to silica show little or no variation. Data comparing the interaction of several ions with both types of the macrocycle 18-crown-6 are given as an example of this point in Table 1.

TABLE 1

Comparison of Aqueous Equilibrium Constants for 1:1 Cation-18-Crown-6 Interaction with the Macrocycle Free in Solution vs. being Bound to Silica Gel

| | Log K* | |
|---|---|---|
| Cation | Free Macrocycle | Bound Macrocycle |
| $Sr^{2+}$ | 2.72 | 2.6* |
| $Tl^+$ | 2.27 | 2.2** |
| $Ba^{2+}$ | 3.87 | 3.7** |
| $Pb^{2+}$ | 4.27 | 4.0*** |
| $Ni^{2+}$ | 0 | 0.2** |

*Log K values for the free marocycle, which are not part of the present invention, are taken from R. M. Izatt, J. S. Bradshaw, S. A. Nielsen, J. D. Lamb, J. J. Christensen, and D. Sen. THERMODYNAMIC AND KINETIC DATA FOR CATION-MACROCYCLE INTERACTION. Chem. Rev., Vol. 85, 271-339 (1985). Log K values for the bound macrocycle were determined by us.
**Ionic strength = 3 M.
***Ionic strength = 1 M.

It is emphasized that similar interaction with metal ions of the bonded macrocycle and macrocycle in solution is only obtained when electron withdrawing groups are not attached to the macrocycle and when the macrocycle is not attached to the silica via one of the donor atoms of the macrocycle.

The data base for macrocycle-cation interaction can be used in choosing a macrocycle for recovering a particular cation. The selective removal and recovery of $Pb^{2+}$ and $Ba^{2+}$ from aqueous solutions using 18-crown-6 bonded to silica gel are examples of a suitable choice of macrocycle for a specific need. The data base measurements indicate that $Pb^{2+}$ and $Ba^{2+}$ are selectively complexed by 18-crown-6 by at least an order of magnitude over all other cations. The selectivity over cations often present in large excess (i.e., $Na^+$, $K^+$, $Mg^{2+}$, $Ca^{2+}$) is much greater. The equilibrium constant values in Table 1 confirm the suitability of the choice of 18-crown-6 as an appropriate macrocycle for the task. The 18-crown-6 bonded silica gel complexing agent has been tested for its ability to remove $Pb^{2+}$ from $H_2O$. These data are presented in Table 2. The diameter of the cylindrical used in developing the data reported in Table 2 was 1.9 cm, and the amount of complexing agent was sufficient to fill a 3.5 cm section of the column. The complexing agent comprised 5.3 moles of macrocycle per cubic meter of silica gel. The detection limit of the atomic absorption spectrophotometer used was 30 ppb (parts per billion).

TABLE 2

The Reduction of $Pb^{2+}$ Concentrations in Aqueous Solution Using an 18-Crown-6 Bonded Silica Gel Column

| Initial $Pb^{2+}$ Concentration (ppm) | Final $Pb^{2+}$ Concentration (ppb) | Volume of $Pb^{2+}$ Solution (ml) |
|---|---|---|
| 207* | <30 | 50 |
| 10** | <30 | >250 |
| 20*** | <30 | 100 |

*$Mg^{2+}$ was also present at a concentration of 1 Molar.
**$Mg^{2+}$ and $Ca^{2+}$ were also present at 0.6 and 0.003 Molar, respectively.
***$Mg^{2+}$ was also present at 0.7 Molar.

The data in Table 2 show that great reductions in aqueous $Pb^{2+}$ concentrations can be achieved using the 18-crown-6 bonded silica gel column even when another cation is present in solution at much greater concentrations. Silica gel can interact with ions to some degree in and of itself. However, tests using a plain silica gel column under conditions identical to those performed with the macrocycle bonded silica gel showed that the aqueous stream $Pb^{2+}$ concentration reductions were not as great. In particular, the plain silica gel column performed quite poorly under conditions where cations other than $Pb^{2+}$ were present at much greater concentrations than that of $Pb^{2+}$. The effect of silica gel or sand interaction with ions flowing through the column can be minimized by blocking the majority of the —OH sites present with trimethylsilyl groups.

Figure 2:
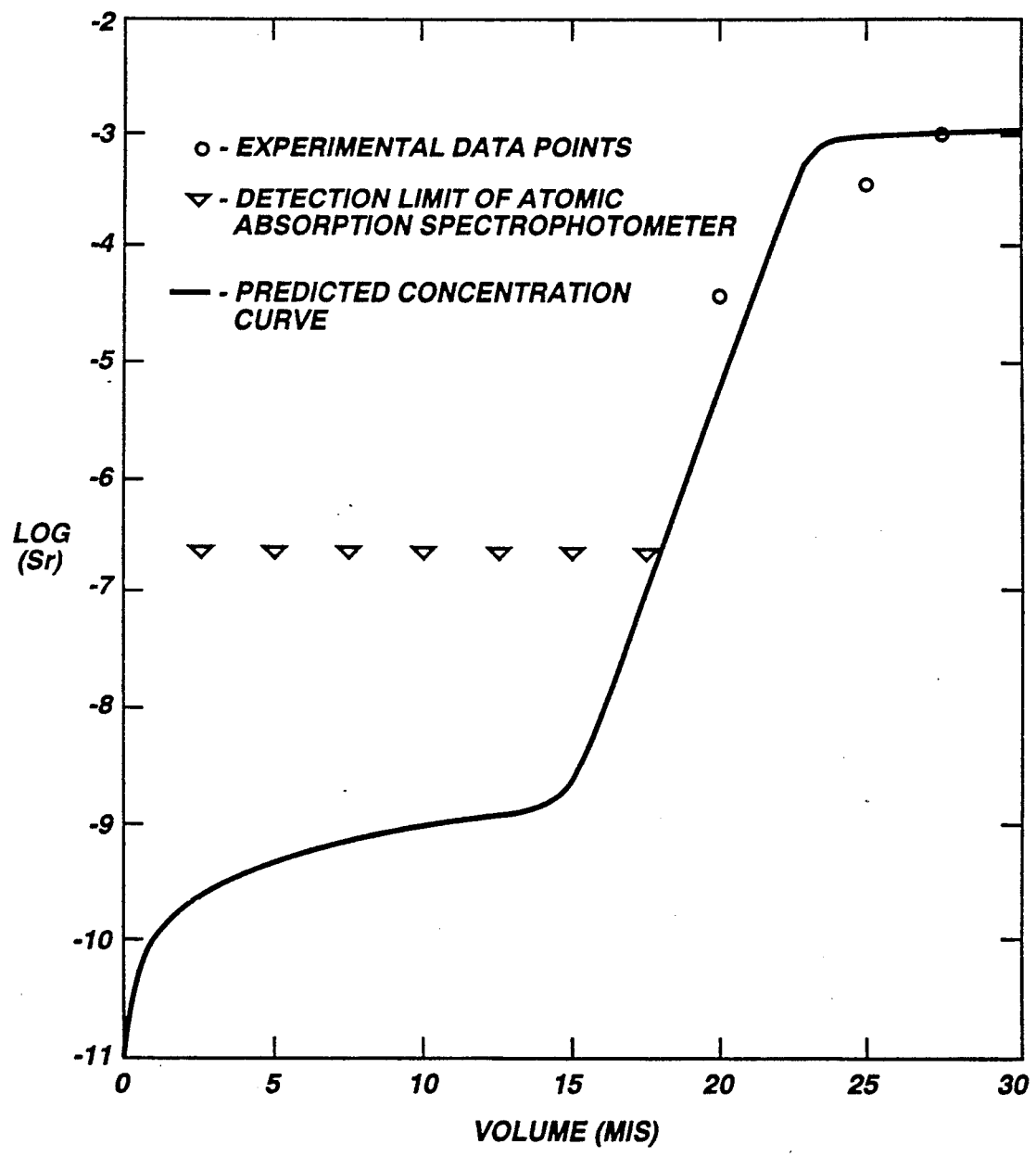
FIG. 2 represents a graph of the predicted (o points) and actual (curve) remaining amount of $Sr^{2+}$ in a solution initially containing 1 M $MgCl_2$ and 0.001 M $SrCl_2$ after flowing the solution through a column containing an 18-crown-6 bonded silica gel vs. the amount of volume of the solution which has been passed through the column. The analytical detection limit is shown by small triangles for those experimental points where no $Sr^{2+}$ could be detected.

The same 18-crown-6 bonded silica gel column has also been tested for its ability to selectively remove $Sr^{2+}$ from a solution containing 1 M $MgCl_2$ and 0.001 M $SrCl_2$. The molar concentrations of $Sr^{2+}$ in the aqueous stream coming out of the bottom of the column vs. the corresponding volumes of solution which have been flowed through the column are plotted as the exponential points in FIG. 2. A predicted $Sr^{2+}$ concentration vs. volume plot is also shown (solid line). The predicted plot was obtained by numerically solving the partial differential mass balance equation for the column using the equilibrium constant for $Sr^{2+}$ interaction. Similar tests with sand and silica gel columns which did not contain the bonded macrocycle showed that very little $Sr^{2+}$ could be removed from the aqueous source phase.

Once the desired ion(s) are attached to the silica gel column they must be removed using a small volume of a receiving phase so that a concentrated and purified product is obtained. In the $Pb^{2+}$ and $Sr^{2+}$ recovery tests described, 99% of the purified $Pb^{2+}$ or $Sr^{2+}$ was recovered from the column using 25 ml of a concentrated basic solution of either ethylenediamine tetraacetic acid (EDTA), citrate or acetate. These reagents form stronger complexes with the ion(s) that the macrocycle does. Hence, they can effectively strip ion(s) from the macrocycle. These ion-receiving phase reagent complexes are easily broken by adding acid to the solution. These species can be recovered as a solid if desired. For example, the $Pb^{2+}$ can be recovered as a solid by using $H_2SO_4$ as the acid and, hence, precipitating $PbSO_4$.

An example of the use of these materials and processes is the quantitative and selective removal of undesired heavy metals such as $Pb^{2+}$ from blood. The silica-gel bonded macrocycle 18-crown-6 (FIG. 2. A-F = oxygen, n = 1) selectively complexes $Pb^{2+}$ over $K^+$, $Na^+$, $Ca^{2+}$, $Fe^{3+}$, proteins and other materials necessary in the body by at least 2 orders of magnitude.

Although the invention has been described and illustrated by reference to certain specific macrocyclic ligands and processes of using them, analogs of these macrocycles are within the scope of the compounds and processes of the invention as defined in the following claims.

We claim:

1. A composition of matter represented by the structural formula:

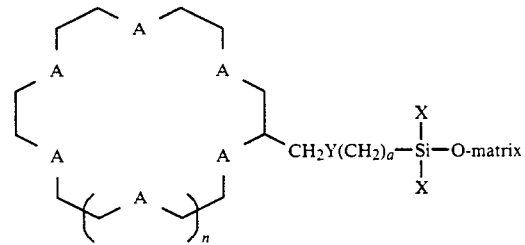

in which A is a member selected from the group consisting of O, O—$CH_2$, S and S—$CH_2$; I is a member selected from the group consisting alkyl, alkoxy, chlorine and O-matrix; Y is selected from the group consisting of O and $CH_2$; a is an integer of from 2 to 16 and n is an integer of from 0-2 and matrix is a member selected from the group consisting of silica, silica gel, glass, glass fibers, titania, zirconia, alumina and nickel oxide.

2. A composition according to claim 1 wherein matrix is selected from the group consisting of silica and silica gel.

3. A composition according to claim 2 wherein Y is O, n is 3 and X is a member selected from the group consisting of methyl, alkoxy, chlorine and O-matrix.

4. A composition according to claim 3 wherein A is O.

5. A composition according to claim 3 wherein A is S.

6. A composition according to claim 4 wherein matrix is silica.

7. A composition according to claim 4 wherein matrix is silica gel.

* * * * *